UNITED STATES PATENT OFFICE.

GUSTAV KEPPELER, OF DARMSTADT, AND ALBERT SPANGENBERG, OF MERZIG, GERMANY; SAID SPANGENBERG ASSIGNOR TO SAID KEPPELER.

PROCESS OF TREATING CLAY, KAOLIN, AND CERAMIC MASSES.

1,001,413.  Specification of Letters Patent.  Patented Aug. 22, 1911.

No Drawing.   Application filed July 27, 1907.  Serial No. 385,883.

*To all whom it may concern:*

Be it known that we, GUSTAV KEPPELER, doctor of philosophy, lecturer, and resident of Darmstadt, in the Grand Duchy of Hesse, German Empire, whose post-office address is Stiftstrasse No. 25, and ALBERT SPANGENBERG, chemist, engineer, and resident of Merzig-on-the-Saar, German Empire, whose post-office address is Loskeimerstrasse No. 7, have invented new and useful Improvements in Processes of Treating Clay, Kaolin, and Ceramic Masses, of which the following is a specification.

It is known that clays and the ceramic masses made therefrom are very different in respect of properties essential for working them. These differences are not to be referred solely to the varying amount of actual clay substance present, since even kaolin, which may be considered as a pure clay substance, does not possess in a perfect degree the properties essential for working it. For the very important operation of molding and working on the wheel, the clays lack plasticity and the necessary power of binding the inert material; but it is not only in respect of these operations that the properties come into consideration.

In the ceramic art the operation of casting is increasingly applied. This operation depends on the phenomenon that pastes of certain clays become fluid, although containing comparatively little water, on addition of alkali; the inert material is held suspended in this fluid and the various objects are formed by casting the fluid in molds of plaster of Paris or wood. For carrying out this operation all clays are not suitable since many have not the property of becoming fluid in presence of comparatively little water on addition of alkali.

The present invention consists in imparting artificially these aforesaid properties to those clays which do not naturally possess them, or have them only in small degree.

It is a common practice to store clay in a damp condition in order to give it plasticity, and the result has been aided or improved by adding to the clay before storing it, filthy or stagnant water. The applicants have discovered that surprising results are obtained by adding to the clay humic acids or substances containing humus. They have further found that the discovery is of a much more general nature, in that the desired properties can be imparted to the clay in a higher degree and in a shorter time if organic compounds of high molecular weight that is to say organic compounds containing more than 6 atoms of carbon, especially organic acids such as humic acid, fatty acids, acids from tannins, acids of the oleic series, resin acids, acids from the decomposition products of albumenoids, such as lysalbic acid, saccharic acid, opened up starch and even prepared cellulose are added together with alkali and ammonia. When working with the addition of alkali, the humic acids have proved in all cases most suitable. They are used in the form of "Casseler Braun" brown coal, peat or rotten wood. The addition of alkali is very essential since it dissolves the said substances and distributes them in the clay. In this manner the plasticity and binding power of clay and the ceramic masses made therefrom is considerably increased in a short time, and the action of the added matter can be aided by mechanical working. But the addition of alkali must be limited; if too much is added the mass becomes too mobile for working on the wheel or by molding. It has also been found that the aforesaid additions give the clay the further property of becoming fluid when suitably mixed with alkali or ammonia. If one of the substances in question is added to a clay which when mixed with alkali cannot or can only imperfectly be used for casting, such clay becomes suitably fluid for casting if an alkali be present in appropriate concentration, with a much smaller proportion of water than would be the case without this addition. Any of the aforesaid substances may be used for this purpose, but humic acids and substances containing humus have proved most useful in all cases. The tannin acids and substances containing tannin have also given very good results. The humic substances have however the advantage of being cheaper. In making a mass suitable for casting the alkali or ammonium salts of all acids, mentioned above or solutions of such salts, may be used.

By the aforesaid mixtures ceramic masses can be made suitable for casting within wide limits. The presence of inert matter of any sort in the mass, usual in the various ceramic industries, does not affect the invention. Indeed, even the presence of corundum or carborundum may be advantageous.

The ease with which a slip suitable for casting can be made from ceramic masses having the aforesaid admixtures and a suitable proportion of alkali is of great importance for producing increased plasticity and binding power. Thus the special advantages of a slip suitable for casting are available. The higher concentration of alkali enables the organic substances to penetrate the mass even to the smallest particles, and the nature of the slip allows the most intimate intermixture of the constituents of the mass, the clay and the inert matter.

For molding and working on the wheel the slip suitable for casting cannot be used even when it contains still less water. Even when the mass has dried to a suitable consistency for handling, it is too mobile for most purposes. It is quite easy, however, to remove this mobility without detracting from the other advantages, by adding with care a small amount of a suitable electrolyte such as a mineral acid, hydrochloric acid, sulfuric acid or even acetic acid or a similar strong acid; salts of strong acids such as calcium chlorid, barium chlorid, aluminium chlorid, aluminium sulfate or the like may also be used. This affords another valuable treatment for improving the qualities of the clay. Besides the aforesaid organic bodies of high molecular weight, for the purpose of thorough penetration of the mass so much alkali or ammonia is added, that from the mass to be treated, in presence of a corresponding proportion of water, an easily cast fluid is produced; the necessary amount of solidity for molding or working on the wheel is then imparted to the mass by judicious addition of a suitable electrolyte such as a strong acid or a salt thereof. In this way the plasticity and binding power of ceramic masses is considerably increased.

The advantages obtained by the common use of the above mentioned additions and the alkali are apparent. It is now quite possible to vary to a large extent the properties of a given material necessary for its working not only for molding and working on the wheel, but also for casting. Moreover, naturally thin or artificially strongly thinned masses are made more easily workable by these additions. A mass which is mixed with so much inert matter that it is quite short and offers great difficulties in working, can now be used to produce ceramic goods by treating it in the above described manner, be it by raising its plasticity, or by converting it into a slip suitable for casting.

Having thus described the nature of our said invention and the best means we know of carrying the same into practical effect, we claim:—

1. The process of treating clay, kaolin and ceramic masses, which process consists in adding to these bodies or masses alkali and an organic compound having the effects in said mixture like those due to the effects of humic acid on such bodies, substantially as and for the purpose set forth.

2. The process of treating clay, kaolin and ceramic masses, which process consists in adding to these bodies or masses ammonia and an organic compound having the effects on the mixture like those due to the effects of humic acid on such bodies, substantially as and for the purpose set forth.

3. The process of treating clay, kaolin and ceramic masses, which process consists in adding to these bodies or masses an alkali and an organic acid having the effects upon the mixture like those due to the effects of humic acid upon said bodies, substantially as and for the purpose set forth.

4. The process of treating clay, kaolin and ceramic masses, which process consists in adding to these bodies or masses an alkali and a substance containing humus.

5. The process of treating clay, kaolin and ceramic masses, which process consists in adding to these bodies or masses an alkali and humic acid.

6. The process of treating clay, kaolin and ceramic masses, which process consists in adding to these bodies or masses an acid of high molecular weight, having the same effect upon such bodies as humic acid, and so much alkali that with a suitable quantity of water the mass will become easily fluid, and finally and gradually a suitable electrolyte, until the desired consistency is obtained, substantially as and for the purpose described.

7. The process of treating clay, kaolin and ceramic masses, which process consists in adding to these bodies or masses an acid of high molecular weight, having the same effect upon such bodies as humic acid, and so much alkali that with a suitable quantity of water the mass will become easily fluid, and finally and gradually an acid until the desired consistency is obtained, substantially as and for the purpose described.

In testimony, that we claim the foregoing as our invention, we have signed our names in presence of two witnesses, this tenth day of July 1907.

GUSTAV KEPPELER.
ALBERT SPANGENBERG.

Witnesses:
EVA SATTLER,
HERMANN WEIL.